US011343643B2

(12) United States Patent
Park

(10) Patent No.: US 11,343,643 B2
(45) Date of Patent: May 24, 2022

(54) USING TELEMATICS DATA TO IDENTIFY A TYPE OF A TRIP

(71) Applicant: Cambridge Mobile Telematics Inc., Cambridge, MA (US)

(72) Inventor: Jun-geun Park, Cambridge, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 15 days.

(21) Appl. No.: 15/874,017

(22) Filed: Jan. 18, 2018

(65) Prior Publication Data

US 2018/0338223 A1    Nov. 22, 2018

Related U.S. Application Data

(63) Continuation of application No. 15/596,384, filed on May 16, 2017, now Pat. No. 9,900,747.

(51) Int. Cl.
*H04W 4/02* (2018.01)
*B60W 40/08* (2012.01)
(Continued)

(52) U.S. Cl.
CPC ............ *H04W 4/027* (2013.01); *B60W 40/08* (2013.01); *B60W 40/10* (2013.01);
(Continued)

(58) Field of Classification Search
CPC ..... G08G 1/0129; G08G 1/015; H04W 4/027; H04W 4/029; B60W 40/0809; B60W 40/09; B60W 2050/0089; B60W 40/08; B60W 40/10; G01C 21/3423; G01C 21/3484; G01C 21/3617; G07C 5/004; G07C 5/02

See application file for complete search history.

(56) References Cited

U.S. PATENT DOCUMENTS 5,550,738 A    8/1996 Bailey
8,015,144 B2   9/2011 Zheng et al.
(Continued)

FOREIGN PATENT DOCUMENTS

CN    102799897    11/2012
DE    102 45 796    4/2004
(Continued)

OTHER PUBLICATIONS

ProQuest Documents India Patents Fulltext record for IN 201404147, first available in database on Jul. 5, 2016, 20 pages (Year: 2016).*
(Continued)

*Primary Examiner* — David A Testardi
(74) *Attorney, Agent, or Firm* — Fish & Richardson P.C.

(57) ABSTRACT

Among other things, an operation of a computational device in identifying a type of a given trip of a person is improved. Historical information is stored about prior trips of the person or of other people or both. The historical information is based on other than recorded motion data of the trips. Features are derived about the prior trips from the historical information. Features indicative of the type of the given trip are identified by the computational device. The type of the given trip is identified based on the features derived from the historical information.

17 Claims, 2 Drawing Sheets

(51) Int. Cl.
| | |
|---|---|
| G08G 1/01 | (2006.01) |
| G01C 21/34 | (2006.01) |
| G08G 1/015 | (2006.01) |
| H04W 4/029 | (2018.01) |
| G07C 5/00 | (2006.01) |
| B60W 40/10 | (2012.01) |
| G07C 5/08 | (2006.01) |
| G08G 1/052 | (2006.01) |
| H04W 4/40 | (2018.01) |

(52) U.S. Cl.
CPC ..... *G01C 21/3423* (2013.01); *G01C 21/3484* (2013.01); *G07C 5/00* (2013.01); *G07C 5/085* (2013.01); *G08G 1/012* (2013.01); *G08G 1/015* (2013.01); *G08G 1/0129* (2013.01); *G08G 1/052* (2013.01); *H04W 4/029* (2018.02); *H04W 4/40* (2018.02); *G07C 5/008* (2013.01)

(56) References Cited

U.S. PATENT DOCUMENTS

| | | | |
|---|---|---|---|
| 8,457,880 | B1 | 6/2013 | Malalur et al. |
| 8,744,769 | B1* | 6/2014 | Bell ................ G08G 1/096838 701/411 |
| 8,983,766 | B2 | 3/2015 | Morley |
| 8,989,914 | B1* | 3/2015 | Nemat-Nasser .......... G06F 7/00 701/1 |
| 9,141,995 | B1* | 9/2015 | Brinkmann ............ G06Q 40/08 |
| 9,398,423 | B2 | 7/2016 | Cordova et al. |
| 9,594,772 | B2 | 3/2017 | Bridgen |
| 9,900,747 | B1 | 2/2018 | Park |
| 10,664,917 | B1* | 5/2020 | Wasserman ............ G01C 21/34 |
| 2006/0129310 | A1* | 6/2006 | Tarrant ................ G01C 21/3617 701/533 |
| 2007/0073477 | A1* | 3/2007 | Krumm ............... G01C 21/3617 701/423 |
| 2010/0292921 | A1 | 11/2010 | Zachariah et al. |
| 2011/0238289 | A1* | 9/2011 | Lehmann ........... G01C 21/3438 701/533 |
| 2011/0300843 | A1* | 12/2011 | Miller ................. H04M 1/6075 455/418 |
| 2012/0226421 | A1* | 9/2012 | Kote ........................ B60R 25/20 701/51 |
| 2013/0041521 | A1* | 2/2013 | Basir ....................... B60R 25/33 701/1 |
| 2013/0073202 | A1 | 3/2013 | Zheng |
| 2013/0158855 | A1* | 6/2013 | Weir ...................... G09B 29/00 701/400 |
| 2013/0158866 | A1* | 6/2013 | Weir .................. G01C 21/3617 701/468 |
| 2013/0166352 | A1 | 6/2013 | Scarr |
| 2013/0183927 | A1 | 7/2013 | Scarr |
| 2013/0238241 | A1 | 9/2013 | Chelotti |
| 2013/0289931 | A1* | 10/2013 | Ledlie ....................... G01P 3/60 702/141 |
| 2013/0307722 | A1 | 11/2013 | Rezaei |
| 2013/0344856 | A1* | 12/2013 | Silver .................... G06N 20/00 455/418 |
| 2014/0100835 | A1* | 4/2014 | Majumdar ............... G06N 3/00 703/11 |
| 2014/0180727 | A1* | 6/2014 | Freiberger ............. G07C 5/008 705/4 |
| 2014/0180730 | A1* | 6/2014 | Cordova ................ G06Q 40/08 705/4 |
| 2014/0266789 | A1* | 9/2014 | Matus ...................... H04Q 9/00 340/870.07 |
| 2015/0176997 | A1 | 6/2015 | Pursche |
| 2015/0177013 | A1 | 6/2015 | Siliski |
| 2015/0187013 | A1* | 7/2015 | Adams ................ G06Q 30/0283 705/4 |
| 2015/0191178 | A1* | 7/2015 | Roy ...................... B60W 40/09 701/36 |
| 2015/0206166 | A1 | 7/2015 | Fletcher |
| 2015/0241565 | A1* | 8/2015 | Chavez ................... H04W 4/02 702/150 |
| 2015/0312655 | A1* | 10/2015 | Balakrishnan ......... G07C 5/008 340/870.07 |
| 2015/0369836 | A1* | 12/2015 | Cordova ................ G01C 21/16 702/141 |
| 2016/0001782 | A1* | 1/2016 | Fiedler ................... B60W 40/09 340/5.81 |
| 2016/0035042 | A1 | 2/2016 | Bomze |
| 2016/0036964 | A1* | 2/2016 | Barfield, Jr ........ H04M 1/72569 455/418 |
| 2016/0066155 | A1* | 3/2016 | Fan ........................ H04W 4/027 455/457 |
| 2016/0086397 | A1* | 3/2016 | Phillips ................ G07C 5/0808 701/32.4 |
| 2016/0148267 | A1 | 5/2016 | Pittman |
| 2016/0205238 | A1* | 7/2016 | Abramson ............ G08G 1/0137 455/456.4 |
| 2016/0216130 | A1* | 7/2016 | Abramson ......... G01C 21/3423 |
| 2016/0241993 | A1* | 8/2016 | Bellens ............. G06Q 30/0201 |
| 2016/0327397 | A1 | 11/2016 | Cordova et al. |
| 2016/0371973 | A1 | 12/2016 | Holleczek |
| 2017/0041205 | A1* | 2/2017 | Rangel ................. H04L 43/065 |
| 2017/0078844 | A1* | 3/2017 | Ota ........................ H04W 4/80 |
| 2017/0099582 | A1* | 4/2017 | Boesen ................ G06Q 20/405 |
| 2017/0151956 | A1* | 6/2017 | Boesen ............. G01C 21/3617 |
| 2017/0371608 | A1* | 12/2017 | Wasserman ............... G06F 3/14 |
| 2018/0181860 | A1* | 6/2018 | Verbist ................. G06N 3/0454 |
| 2018/0270241 | A1* | 9/2018 | Herrmann ............ B62D 15/021 |
| 2018/0315147 | A1* | 11/2018 | Mendels ................ G06Q 50/26 |
| 2018/0345985 | A1* | 12/2018 | Lin ....................... G07C 5/0841 |
| 2019/0215660 | A1* | 7/2019 | Slushtz .................... G01S 19/19 |

FOREIGN PATENT DOCUMENTS

| | | |
|---|---|---|
| EP | 2 337 309 | 6/2011 |
| IN | 201404147 I3 * | 7/2016 |

OTHER PUBLICATIONS inPASS Screenshots of bibliographic information for Indian application 4147/MUM/2014, from https://ipindiaservices.gov.in/publicsearch, 2 pages, retrieved Aug. 5, 2020 (Year: 2020).*

Stenneth, Leon et al., "Transportation mode detection using mobile phones and GIS information", ACM SIGSPATIAL GIS '11, 19th ACM SIGSPATIAL International Conference on Advances in Geographic Information Systems, Nov. 1-4, 2011. Chicago, IL, pp. 54 to 63 (Year: 2011).*

Reddy, Sasank et al., "Using mobile phones to determine transportation modes", ACM Transactions on Sensor Networks, vol. 6, No. 2, Article 13, Publication date: Feb. 2010, pp. 13:1 to 13:27. (Year: 2013).*

Zhang, Zelun et al., "A new post correction algorithm (PoCoA) for Improved Transportation Mode Recognition", 2013 IEEE Conference on Systems, Man, and Cybernetics, Oct. 13-16, 2013, Manchester, UK, pp. 1512-1518 (Year: 2013).*

Ellis, Katherine, "Supervised Classification of Human Behaviors from Wearable and Mobile Sensor Data", University of California, San Diego Dissertation, 2016, ProQuest No. 1019379, 106 pages (Year: 2016).*

International Search Report and Written Opinion for App. Ser. No. PCT/US18/30869, dated Sep. 18, 2018.

European Search Report in European Application No. 18801329.6, dated Jan. 22, 2020, 7 pages.

International Preliminary Report on Patentability for International Application No. PCT/US2018/030869, dated Nov. 28, 2019, 8 pages.

U.S. Appl. No. 15/596,384, filed May 16, 2017.

Montini, Lara et al., "Implementation and evaluation of learning routines for mode and trip purpose detection," Peacox—Persuasive Advisor for CO2-reducing cross-modal trip planning, D 4.3, Jun. 25, 2014, 21 pages.

(56) References Cited

OTHER PUBLICATIONS

Reddy et al., "Determining transportation mode on mobile phones," in Wearable Computers, 2008. ISWC 2008. 12th IEEE International Symposium, 2008;25-28.
Sankaran et al., "Using mobile phone barometer for low-power transportation context detection," in Proceedings of the 12th ACM Conference on Embedded Network Sensor Systems, 2014;191-205.
Stenneth et al., "Transportation mode detection using mobile phones and GIS information," in Proceedings of the 19th ACM SIGSPATIAL International Conference on Advances in Geographic Information Systems, 2011;54-63.
Xu, Dafeng et al., "Transportation modes identification from mobile phone data using probabilistic models," from J. Tang et al. (Eds.): Advanced Data Mining and Applications, ADMA 2011, Part II, LNAI 7121, pp. 359-371, 2011.
Yu et al., "Big data small footprint: The design of a low-power classifier for detecting transportation modes," Proceedings of the VLDB Endowment, 2014;7:1429-40.
Zheng et al., "Learning transportation mode from raw GPS data for geographic applications on the web," in Proceedings of the 17th International Conference on World Wide Web, 2008;247-56.

\* cited by examiner

USING TELEMATICS DATA TO IDENTIFY A TYPE OF A TRIP

This application claims priority to and is a continuation of U.S. application Ser. No. 15/596,384, filed on May 16, 2017. The contents of the foregoing application are incorporated by reference herein.

This description relates to using telematics data to identify a type of a trip.

In some contexts, telematics applications involve collecting, storing, and processing data from sensors in vehicles. In particular, mobile telematics (sometimes known as "smartphone telematics") uses mobile sensing technologies to collect, store, and process data from built-in or external sensors of a mobile device, such as a smartphone.

A mobile telematics application may employ various schemes to decide when it should collect sensor data. A common mode of operation is to collect sensor data (for example, involving one or more of acceleration, gyroscope, magnetometer, position, velocity, or barometer, among others) whenever the mobile device associated with the sensor is thought to be moving, or thought to be associated with driving (for vehicular applications), or has undergone a significant change in location from a previous known position. The application collects data from the sensors until the mobile device has come to rest for a substantial amount of time.

Each collected item of sensor data can be timestamped, and a sequence of such timestamped sensor data items is sometimes called a recording. A common approach is to collect sensor data items continuously during a period; in this case, one may segment sequences of the collected data according to a rule (e.g., sequences that are separated by substantial periods of rest) to form multiple recordings.

We use the term "recording" broadly to include, for example, any collected, assembled, organized, stored, or accumulated set, sequence, or series of data items that together relate to, capture, involve, or reflect an episode, event, or other occurrence associated with travel or transportation. In particular, a recording may be associated with or represent one or more trips, and one or more recordings can be associated with a single trip.

We use the term "trip" broadly to include, for example, any instance of travel from an origin place to a destination place. In some cases, a trip is such an instance involving a single transportation mode (e.g., a car) or a single role of a person being transported (e.g., a driver) or both. For example, a trip could be an instance of travel from a house to a grocery store in a car in which the user of a mobile device from which a recording is captured is a driver of the car.

We use the term "transportation mode" broadly to include, for example, any form, conveyance, or manner of travel, such as car, truck, pedestrian (walking or running), bicycles, motorcycles, off-road vehicles, buses, trains, boats, or airplanes, to name a few.

We use the term "role" with reference to a person being transported broadly to include, for example, any class, category, or type of activity, such as, passenger, driver, occupant, patron, or rider, among others.

Thus, a trip can be considered to be of a type in the sense that it can involve a transportation mode, or a role, or both, or can involve other classifications or categories associated with the trip, for example, commuting versus pleasure, rush hour versus off hour, active passenger versus passive passenger.

In some cases, a mobile application running on the mobile device makes recordings and decides when a recording is to start and end. A recording can be started and stopped for a variety of reasons by a mobile application automatically without user input, and could happen in the background without the user visiting the application on the mobile device; for example, recording may be done only when there are specific activities occurring, such as movement faster than a certain speed or a significant change in location from a previously known position. The recording may also be started and stopped manually by providing suitable user-interface options to the user (e.g., the person engaged in the travel). We sometimes refer to a person who is a driver or passenger or otherwise involved in a trip a "participant". We refer to a user sometimes as a person who uses or is associated with a particular smart phone or other mobile device and sometimes as a participant in a trip. Quite often we refer to a user as both the participant in a trip and a person who was associated with a particular mobile device that was used in or carried by the participant during a trip.

Identifying a type of a trip that is captured in a recording can be very useful for a variety of purposes. Here we describe technology that uses telematics data (e.g., recordings of sensor data captured on a mobile device, and other information) to identify (for example, classify) such a type, for example, a mode of transportation or a role of a person being transported or other types. The identification of the trip type can be automatic or semi-automatic (assisted by human input).

We use the term "identify" broadly to include, for example, analyze, classify, divide, label, predict, distinguish, determine, detect, establish, or select. We often use the words "classify" and "predict" interchangeably with "identify".

The identification of a transportation mode can be useful in many diverse applications. For example, developers and users of applications in vehicle insurance and safe driving programs may be interested in assessing driving quality or other aspects of driving behavior only for trips for which the transportation mode is "car," the role of the person being transported is "driver," and possibly other aspects of the type of trip are met. Typically it is important to exclude from the trips that will be the subject of the insurance or safe driving analysis other modes of transportation, including pedestrian (walking or running), bicycles, motorcycles, buses, trains, boats, airplanes, off-road travel, and others. Automatic or semi-automatic identification of a transportation mode as, say, a car being driven by a particular person, can be useful in real-world contexts. For example, when a mobile application allows the user to specify the start or end (or both) of a recording, correct independent identification of the transportation mode can overcome a user's mistakes of omission or commission. More generally, any technology for identifying trip types, whether automatically or semi-automatically, will sometimes be in error: the data captured in a recording may not have come from a mobile device in the identified mode of transportation, or may not be associated with any mode of transportation at all. Therefore, an ability to detect irrelevant recordings and incorrect identifications and correct or remove the corresponding trips from subsequent processing and analysis is a useful feature of the technology to ensure integrity of the telematics data and interpretations (e.g., transportation mode or other trip type identifications) made with them.

It is known in prior art how to provide a fast, coarse-grained estimate of transportation mode. Many smartphones have a method of providing an instantaneous classification of trip mode using software or dedicated motion detection hardware. Typically, only a few distinct trip modes are classified, and trip mode detection accuracy is substantially sacrificed in the interests of lowering the latency of the response.

Identifying the role of a person participating in a trip, for example, the role of the person as a driver or passenger can also be a useful task for telematics applications. Such identification can be useful itself and also in combination with information that identifies the mode of transportation or other aspects of the type of a trip. For example, some items of data collected from a passenger's mobile device in a car may not be directly related to driving behavior of the person associated with the mobile device. In an example of driving behavior information used in a driving safety analysis, being distracted by the mobile device (e.g., a smartphone) in a role as a passenger is less of a safety concern than smartphone distraction in a role as a driver. Therefore, depending on an application, it may be useful to exclude from subsequent uses and analyses data captured from a mobile device while a user of the device had the role of a passenger.

SUMMARY

In general, in an aspect, an operation of a computational device in identifying a type of a given trip of a person is improved. Historical information is stored about prior trips of the person or of other people or both. The historical information is based on other than recorded motion data of the trips. Features are derived about the prior trips from the historical information. Features indicative of the type of the given trip are identified by the computational device. The type of the given trip is identified based on the features derived from the historical information.

Implementations may include one or a combination of two or more of the following features. The stored historical information is indicative of historical patterns of the prior trips. The historical patterns are associated with one or more of: times of the prior trips, locations of the prior trips, or trajectories of the prior trips. The features include one or more of: the person having been a passenger in one or more of the prior trips, a locality of one or more of the prior trips, a contextual proximity of one or more of the prior trips to the given trip, trip similarities of one or more of the prior trips to the given trip, calendrical variations of the prior trips, or phone usage patterns. The features include one or more of the dates, days-of-week, or times of the prior trips. The features include labels of the prior trips provided by the person or other people or both. The features include identifications of the types of the prior trips. The type of the given trip includes a role of the person in the trip. The role of the person includes a role as a driver or a role as a passenger. The type of the given trip includes a transportation mode. The transportation mode includes a car. The transportation mode includes other than a car. Historical information about prior trips is received from a mobile device of the user (e.g., of the person). The identifying of the type of the given trip includes computing features of the given trip based on data associated with the given trip. The data associated with the given trip includes sensor data. The feature includes a period of constant speed associated with the type of the given trip. The feature includes idle vibration indicative of a characteristic of a vehicle. The feature includes tilting. The feature includes usage of a mobile device during the given trip. The feature includes straightness of a trajectory during the given trip.

In general, in an aspect, an operation of a computational device in identifying a type of a given trip of a person is improved. Historical information is stored indicative of behaviors of the person for prior trips. Features are derived about the behaviors. The person is identified as associated with the given trip based on the derived features about the behaviors of the person and information indicative of the behavior of the person for the given trip.

Implementations may include one or a combination of two or more of the following features. The historical information includes motion information for the prior trips. The motion information includes velocity or acceleration information. The features include one or more of acceleration greater than a threshold, deceleration greater than a threshold, or velocity greater than a threshold. The historical information includes non-motion information received from a mobile device during the trip. The features include usage of the mobile device. The person is identified as being a driver during the trip.

In general, in an aspect, an operation of a computational device in identifying a type of a given trip of a person is improved. Information is stored about expected public transportation trips. Features are derived about the expected public transportation trips. The given trip is identified as a public transportation trip based on the derived features.

Implementations may include one or a combination of two or more of the following features. The information about expected public transportation trips includes schedule information or route information or both. The features about the expected public transportation trips include one or more of times of trips or start locations of trips or end locations of trips. The method of claim in which identifying the given trip as a public transportation trip includes matching one or more of the following features of the given trip and the expected public transportation trips: start time, end time, start location, or end location.

In general, in an aspect, an operation of a computational device in identifying a type of a given trip of a person is improved. The type of the given trip is automatically identified as a trip of an identified transportation mode and an identified role of the person. Information is received from the person identifying a transportation mode or a role of the person or both for the given trip. A type of a future trip of a person is identified based on the information received from the person, or the received information is provided from the person to a third party as a correct identification of the type of the given trip, or both.

In general, in an aspect, an operation of a computational device in identifying a type of a given trip of a person is improved. Motion data of a recording that spans a period including the trip is stored. The motion data of the period is segmented. The segmenting includes change-point segmentation to produce tentative segments and length segmentation of the tentative segments to produce final segments.

Implementations may include one or a combination of two or more of the following features. The successive final segments are temporally smooth. The temporal smoothing includes reassembling two or more of the final segments.

In general, in an aspect, an operation of a computational device in identifying a type of a given trip of a person is improved. Data is captured representing an operational feature of a transportation mode during the given trip. The operational feature of the given trip is computed based on the captured data. The operational feature is provided to the computational device for use in identifying the transportation mode.

Implementations may include one or a combination of two or more of the following features. The captured data includes sensor data. The operational feature includes a period of constant speed associated with the type of the given trip. The operational feature includes idle vibration indicative of a characteristic of a vehicle. The operational feature includes tilting. The operational feature includes straightness of a trajectory during the given trip.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DETAILED DESCRIPTION

The technology that we describe here can be applied to identify a transportation mode or a role of a person who participated in a trip or other trip type based on a recording.

The technology is capable of identifying a sequence of one or more transportation modes, participant roles, or other trip types from a recording representing a single trip or multiple trips. The modes of transportation that can be identified include: car, airplane, bus, train, bike, boat, motorcycle, off-road, and foot, for example. In off-road mode, trips are on unsurfaced roads, often using an all-terrain vehicle (ATV) or skis. Foot mode includes running and walking. A recording of a trip may occur in error or be irrelevant when no actual trip has occurred. We refer to such recordings as "phantoms". In some implementations, phantom trips are identified as a particular one of the possible transportation modes. The technology is also capable of identifying roles of people who are being transported, such as drivers and passengers for a car trip. The roles can be identified by the technology or may be identified by other means, e.g., other classification technology, an indication by a user, a hardware device installed in the car (see United States patent publication 2015/0312655, incorporated here by this reference) or a combination of them.

In some implementations, the technology identifies one or more transportation modes of one or more trips using recordings captured by one or more mobile devices. In some instances, the technology can use a variety of mobile sensor data included in the recordings to extract (e.g., derive) features useful for identifying transportation modes, participant roles, or other trip types, and non-trip phantom recordings.

Figure 1:
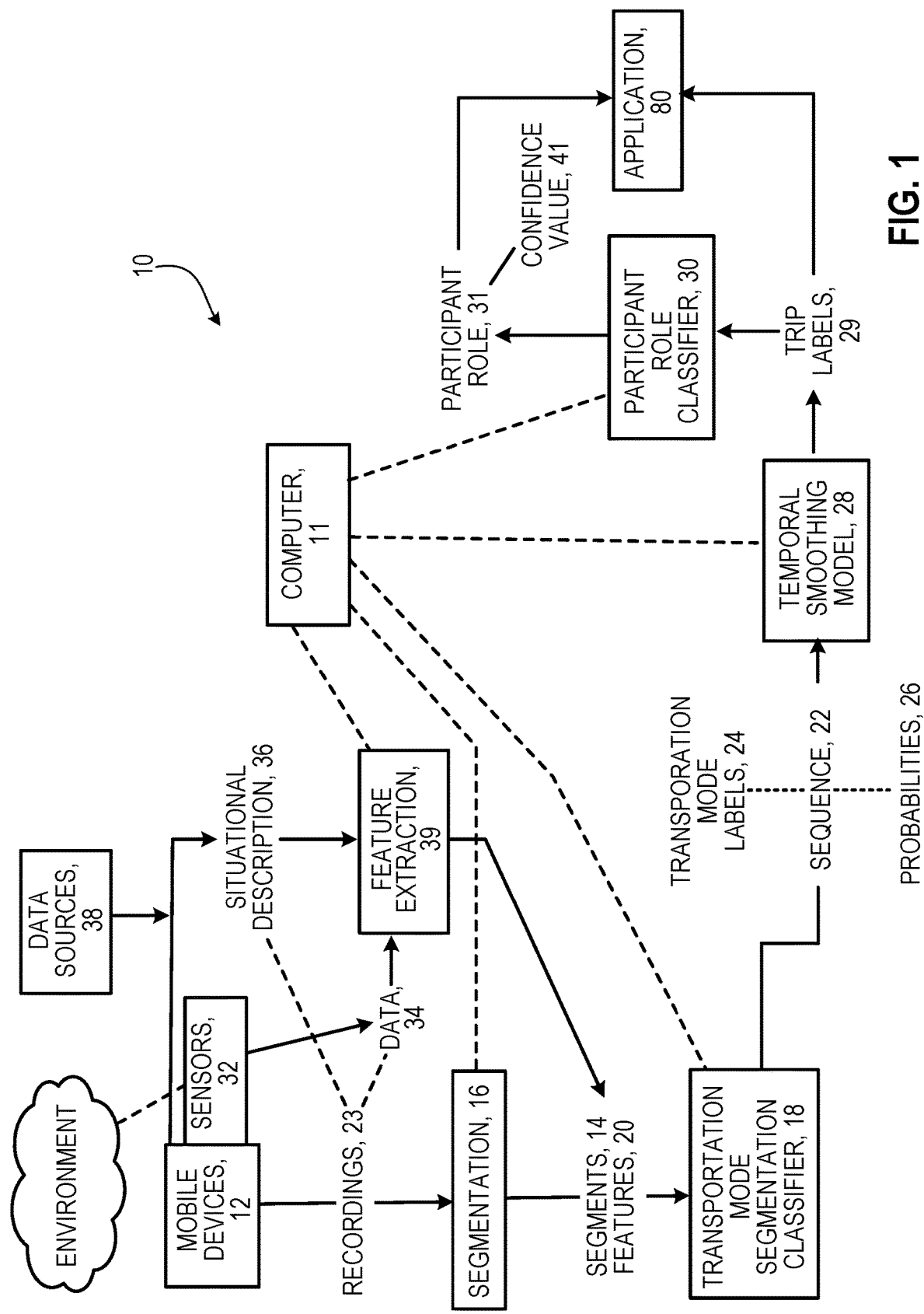
FIG. 1 is a block diagram of a telematics system.

As shown in FIG. 1, in some implementations, the technology 10 runs in stages on a computer 11 that can be located centrally and identifies transportation modes 24 and participant roles 31 for one or more trips represented by one or more recordings 23 collected from one or more mobile devices 12.

In one of the stages, each of the recordings is divided into segments 14 using hybrid segmentation 16. One or more segments may be associated with a given trip. Then, each segment is classified according to transportation mode by a transportation mode segment classifier 18 using features 20 extracted from data within the segment. The transportation mode segment classifier is trained to be robust against overfitting, and prediction overrides can be used to correct erroneous predictions. The output of the transportation mode segment classifier, a sequence 22 of transportation mode prediction labels 24 (each label identifying a transportation mode) and probabilities 26 (each representing the probability that a given label is correct), is smoothed using a temporal smoothing model 28 based on a Hidden Markov Model (HMM). Since individual segment classification results can be noisy and erroneous, we smooth the series of transportation mode labels using a temporal model that captures continuity of transportation modes and switching behavior between modes. The technology determines representative trip label(s) 29 (each label identifying a transportation mode for a trip) from a set of available transportation mode prediction labels depending on application requirements. Another application 80 may require such a representative label for the captured trip (e.g. to convey feedback to the user). A role classifier 30 is applied to those segments for which the transportation mode prediction labels are, for example, "car" to identify car segments in the recording that are segments in which the participant associated with the mobile device had a role 31 of, say, "driver." Although this example referred to transportation mode and role identification, in some applications, other types associated with trips could be identified.

In some implementations of the process shown in FIG. 1, the transportation mode segment classifier and the role classifier determine the sequence of transportation modes from data collected by a mobile device 13 typically carried by the participant in a trip. Most modern mobile devices, such as smartphones, are equipped with a variety of sensors 32 that measure physical properties relevant to movements of a participant and to a transportation mode being used by the participant and other aspects of the environment. The data 34 (which can be considered part of the recordings 23) that result from measurements of these physical properties by the sensors of the mobile devices can be combined with higher-level situational descriptions 36 (from the mobile device and in some cases other data sources 38) about a trip, such as location, time, trajectory, or user, resulting in a rich set of features 20 used by the transportation mode segment classifier and role classifier. In some instances, some or all of the situational descriptions can be considered part of the recordings 23.

The sensors 32 and data sources 38 used by the technology can include, but are not limited to any one or a combination of any two or more of the following: accelerometer (3-axis), gyroscope (3-axis), magnetometer (3-axis), barometer, GPS receiver, cell tower, or Wi-Fi locations (location estimates derived from information from cell towers and Wi-Fi networks are sometimes referred to as "network locations"), identity and connection information of external devices, such as beacons and Internet-of-Things (IoT) devices, sensor data from external devices, spatiotemporal description of the trip, user information, trip history, on-device activity recognition, and map and map-matched data.

From the raw data produced by the sensors and other data sources, the computer or other technology computes the set of features 20, which are used as input to the classifiers as explained later. None of the input sources listed above are mandatory; if a certain source of input is missing, the technology will not compute the corresponding features and mark them as "missing" instead, which can be handled by the classifiers appropriately, for example, as a feature value on its own.

One or more of the technology stages of FIG. 1 may be applied live (in real time) during the collection of sensor data (e.g., by running every few minutes using the data collected after the most recent application of the data, even before a recording or a trip has been completed). Or it may be applied after an entire recording has been made. Each recording (a sequence of recordings may be thought of as a single larger recording) can include metadata (e.g., part of or in addition to the situational descriptions 36 in FIG. 1) describing the recording. Examples of the metadata include spatio-temporal description of the trip (e.g., city, time-of-day, day-of-week), hardware information (e.g., type of mobile device operating system), and user data (e.g., preferred transportation mode). In addition, the technology may utilize other types of information derived from the recordings, such as map matching of a vehicle trajectory to a road network (see U.S. Pat. No. 8,457,880, incorporated here by reference). As discussed with reference to FIG. 1, in some implementations, the output of the technology is an identification of each segment of a recording as belonging to a particular transportation mode, together with an optional confidence in the reported classification, and a role of the participant associated with the mobile device.

As mentioned above, an output of the transportation mode classifier 18 is a series of transportation modes along with classification confidences 26. In some implementations, for each segment in a sequence, the classifier assigns one of the following transportation mode labels to it along with a confidence value: car, airplane, train, bus, boat, bike, motorcycle, foot (walking or running), off-road, non-trip recording ("phantom").

In some cases, segments identified as having transportation mode "car" are further classified into one of the following roles by the role classifier together with a confidence value 41: driver, passenger.

The sequence of transportation mode labels or identifications of roles or both can be provided as feeds to a wide variety of consuming applications and users, including individual users and enterprises and their applications.

There are a number of advantages associated with the technology: By automatically or semi-automatically providing transportation mode labels, an app running on a mobile device that captures the recordings can be made much less onerous for drivers than those that always require manual labeling of the transportation modes of trips and trip segments. The model validation provides an assessment of accuracy (both precision and recall), along with the classification confidence of a particular prediction. A consumer of this information can decide how much confidence to place in each prediction. For example, an insurance company can weigh information appropriately for actuarial purposes. Providing multiple transportation modes, some of which are mutually exclusive (like car and train) and others that can overlap (like car and off-road) allows for fine-grained control over a final classification output. By automating the process of adding new transportation modes and (re-) training the models, the technology can classify a large set of transportation modes and dynamically add new ones with relative ease. The technology can enable a telematics service provider to offer high quality transportation mode and role classification in its products and businesses.

Here we describe each stage of the technology in greater depth.

Segmentation

Figure 2:
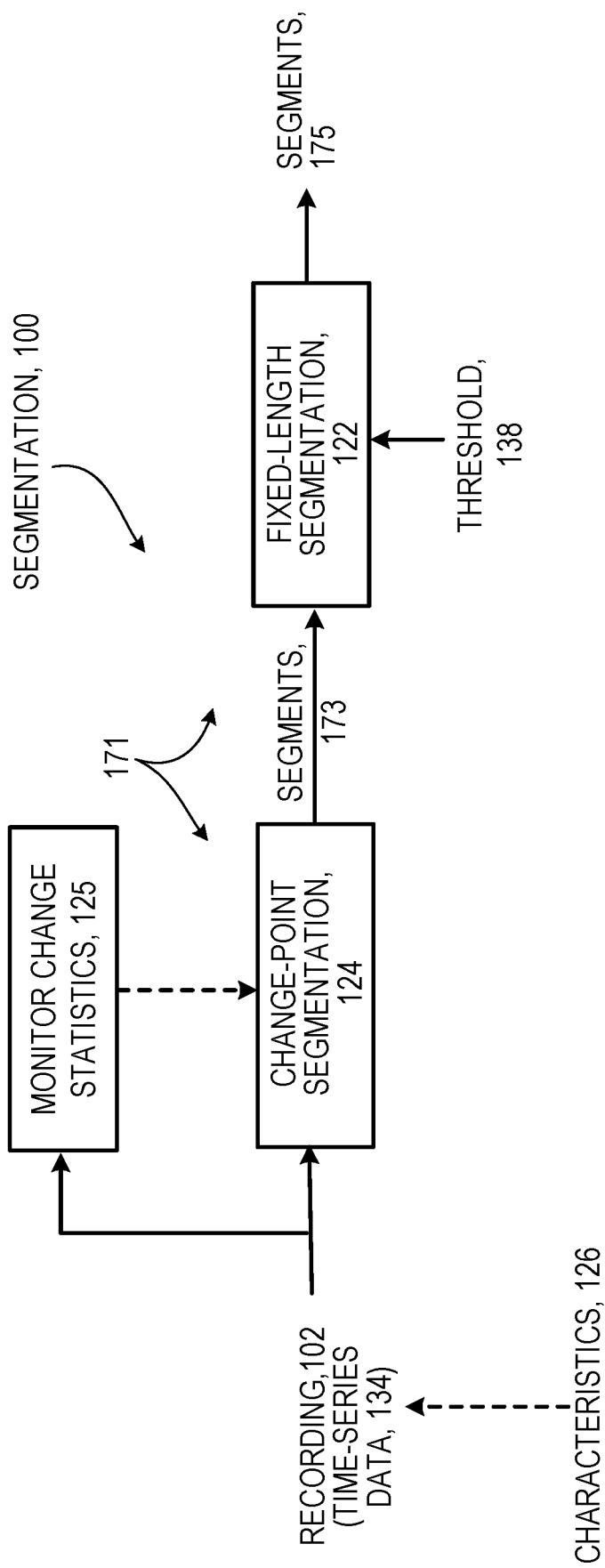
FIG. 2 is a flow diagram of segmentation.

As shown in FIG. 2, in some implementations, to perform segmentation 100 of an input recording 102, two schemes are combined: fixed-length segmentation 122 and change-point segmentation 124. The fixed-length segmentation divides data into segments that have the same fixed time length. The change-point segmentation begins a new segment based on changes in one or more characteristics 126 of the data. The technology combines the schemes to benefit from the advantages of both.

Among the advantages of a fixed-length segmentation are that it is easier to implement and guarantees that each segment is not so long as to span genuine transitions between different transportation modes. Among the disadvantages are that the duration of each segment is determined a priori and the determined segment length may not be flexible enough to accommodate different needs. For example, it is useful when a segment is sufficiently long to ensure that frequency spectra (which are used for frequency domain-based analytical features) computed for each segment have enough resolution. On the other hand, the segment should not be excessively longer than the typical minimum duration of any transportation mode, since longer segments then may incorrectly include multiple modes.

A change-point segmentation scheme examines time-series input data and segments it when a change occurs that is significant in terms of one or more monitored statistics 125. In some instances, the statistics are computed in an online or a sliding-window fashion. At each point in time during the series, recent values are compared against older values using techniques such as cumulative sum to detect a change in the statistics as quickly as possible with low false positives. For example, the statistics that are monitored (based on the time series data) can include one or more of the following: An abrupt change in sensor readings (as measured, for example, by first-order derivatives or second-order derivatives), drift over time in sensor readings, change in "volatility" (as measured by variance, range, or inter-quartile range), significant location changes in GPS and network locations, change in on-device classification results, or change in the road type in map matched output. Among the benefits of change-point segmentation are that it does not unnecessarily segment the data that are deemed to belong to a given transportation mode, therefore presenting more data for a given segment for use by the segment classifier. However, change-point segmentation has a risk of missing mode boundaries, resulting in a long segment potentially containing multiple transportation modes.

The technology uses a hybrid segmentation scheme 171 that combines advantages of both fixed length segmentation 122 and change-point segmentation 124. The input time-series data 134 is first segmented by the change-point segmentation scheme 124 at major change points in the series. If the length of a resulting segment 173 is longer than a predefined threshold 138, then the segment is further divided into smaller segments 175 using the fixed-length segmentation 122. By doing this, potentially missed boundaries can be recognized later without having to unnecessarily split an interval of a single transportation mode into several smaller segments, which would reduce the amount of data available to the segment classifier.

Transportation Mode Classification Features

As shown in FIG. 1, during trip mode classification, each segment of data of a recording is classified into one of the transportation modes. From the sensors and other data sources described earlier, various features 156 are computed for each segment, which are used as inputs by the transportation mode classifier. The features can include one or a combination or two or more of the following:

Descriptive statistics: For each sensor type, a set of descriptive statistics is computed for the data that belongs to a given segment, including mean, standard deviation, coefficient of variation (the ratio of the standard deviation to the mean), order statistics (minimum, 5th, 25th, 50th, 75th, 95th percentile and maximum), range (the difference between the maximum and the minimum), robust range (the difference between the 95th and 5th percentile value), interquartile range (the difference between the 75th and the 25th percentile value), skewness (the third moment), and kurtosis (the fourth moment). For multi-axial sensors, such as tri-axial accelerometer or tri-axial gyroscope, the statistics are computed from the magnitude of instantaneous vector measurements.

Stillness of motion: The stillness of motion is captured by computing a fraction of time for which data values captured from inertial sensors (accelerometer and gyroscope) remain flat. For each data sample in the segment, a standard deviation is computed over a rolling window centered on it. If a standard deviation value is below a certain threshold, then the corresponding window is considered as flat. For a given segment, the fraction of flat windows divided by all windows is computed and used as a feature representing the stillness of motion within the segment. This feature is particularly effective in detecting phantom recordings, some of which may occur due to a false alarm by a non-inertial sensor, such as faulty location change alerts.

Speed profile: If GPS speed data is available, a speed profile of the segment is created to capture speed dynamics that may be unique to the transportation mode of a trip. A speed profile can include: various descriptive statistics of GPS speed, duration and the fraction of zero and non-zero speed intervals, frequency and duration of stops, distribution of speed-derived acceleration (computed as the derivative of speed), or distribution of jerk (computed as the derivative of acceleration, or the second derivative of speed) or combinations of them. Most speed statistics are computed in two ways, using either all speed measurements or only non-zero speed measurements. This two-way approach accounts for circumstances when there is no motion due to external factors for an undefined amount of time (e.g., a vehicle sitting in traffic). Buses often make frequent stops the durations and intervals of which are fairly uniform compared to other transportation modes. The distribution of acceleration and jerk give complementary evidences in addition to acceleration and gyroscope based features for distinguishing heterogeneous types of motorized vehicles of which structure, size and weight differ.

Extreme speed or altitude: An extremely high speed measurement given by GPS readings indicates that the trip was done either by an airplane or a high-speed train among the transportation modes that we may consider. Likewise, a high value of altitude measurement from GPS readings indicates an airplane trip. Several speed (e.g., 40, 60 and 80 m/s) and altitude (e.g., 500, 1000 and 2000 m) thresholds can be used to capture various degrees of extremeness in speed or heading, respectively.

Constant speed detection: Some transportation modes can travel at a constant speed, precisely controlled by an automatic speed control system (such as cruise control). Therefore, detecting a period of constant speed (at a certain minimum speed or higher) helps the classifier distinguish some transportation modes equipped with a cruise control device from others for which cruise control is not common or not available at all. To reduce false detections, in some implementations minimum speed and duration requirements can be imposed for a period of speed measurements to qualify as a constant speed interval.

Frequency domain analysis: Frequency domain features can be extracted to characterize motion and vibration at different frequencies. For a vehicle, for example, the structural and mechanical differences (design, shape, volume, weight, or material) and the differences in the powering mechanism, such as the engine type (combustion, electrical, or human-powered) or power delivery (e.g., powertrain for motor vehicles) endow each type of vehicle with unique frequency characteristics. A Fast Fourier Transform (FFT) on both the accelerometer and gyroscope data can be used to estimate a spectral density, from which various frequency domain features are extracted. Those features include: peak frequency, energy around the peak frequency ("peak power"), ratio of the peak power to the background power, fraction of the peak power over the overall spectral energy, power values at different frequency bands and spectral entropy. These frequency domain features are particularly effective for distinguishing cyclic motions such as walking, running, or bike from other transportation modes.

Idle vibration: The vibration characteristics of a vehicle at idle state show its traits defined by its mechanical and structural resonance driven by its engine, excluding vibration components induced by the movement and external factors associated with the movement, such as roughness of the road. The process of capturing idle vibration begins by detecting idle periods first from the speed, acceleration and gyroscope measurements, and computing a few statistics within those periods from accelerometer and gyroscope data, such as standard deviation and spectral energy after filtering signals with a band-pass filter to suppress any motion-induced low frequency components as well as high frequency noise components.

Tilt detection: Vehicles with two wheels (e.g. bicycles, motorcycles) must lean more than four-wheeled vehicles to make a turn or to stand on a stop. A useful feature is whether the vehicle (hence presumably the device on it also) leaned sideways especially when the vehicle was turning or was stopping, and recovered to its original orientation once the turn or stop was over.

To detect a tilt, the instantaneous gravity direction is tracked by applying a low-pass filter on the series of acceleration measurements, then finding moments when the gravity estimate changes significantly then reverts back to the original value within a pre-defined interval. Simultaneously, turns and stops are detected from gyroscope measurements and GPS speed measurements, respectively. The detected tilting moments that match the detected turns and stops are considered as tilting due to leaning of the vehicle. The number of matched tilts and the fraction of matches over all occasions of tilts are used as features for the classifier.

Date and time: Calendrical information, such as month, day of the week, and hour, can be extracted as features from the start timestamp of the recording. These date and time features give a priori information on which transportation modes are preferred, in general or by the person associated with the mobile device, at the time the trip occurred. For example, bicycles may be less preferred during winter months than summer months; a trip starting at 3 AM may be more likely to be one of a private transportation mode (e.g. car) than a public transportation mode (e.g. train). This information can be extracted at various layers of population, e.g. from all users, users in a certain location or with certain traits, or individual users.

Location and location class: The country (e.g., United States) and the region name (e.g., Boston) of a recording are used as features to provide the classifier regional preferences of transportation modes. This information can be obtained either from map data (as a side-product of map matching of the trajectory), or by using a reverse geocoding service that maps a point location to a human-readable, semantic place name. A location type is derived indicating whether the trip has occurred in an urban, suburban, or rural area, by computing the distance from the location of the trip to the nearest city center.

Device usage: A user is expected to use his mobile device less frequently or not at all in certain transportation modes when he is a driver of the vehicle (e.g. car, motorcycle, or bike), than in other transportation modes where he is a passenger (e.g. bus, train or airplane). Therefore, knowing device usage corresponding to a recording can provide evidence for differentiating these two different groups of transportation modes. One good way to obtain device usage information is by observing screen on and screen off events. Device usage may be captured by a variety of techniques. From device usage events, basic statistics can be computed on general usage patterns, such as total duration, number of screen usage events, and average duration per individual event. The same set of features could be computed only when the speed is above a certain threshold to capture device usage when the vehicle is moving at higher speeds, since it is considered less likely that the mobile device would be used by a driver of certain transportation modes (e.g., motorcycle) than others (e.g., car). Another feature is whether the device usage corresponds to moments in a recording when the vehicle is stopped, because a passenger is not expected to refrain from using the mobile device when the vehicle is moving, but a driver is generally assumed to refrain.

Proximity to transport stations: The distance from locations associated with a recording to nearby transport stations, including airports, train stations, and bus stops can be measured as a feature. For each of the first and last GPS locations of a recording, we find the closest station of each type (e.g., airports, bus stations, or train stations). Then, the closest distance is taken as a feature representing proximity to that type of transport station. For example, when the first GPS location is considered, the distance from it to the closest airport is taken as a feature representing proximity of the trip start to the nearest airport. This is repeated for every combination of the first or the last GPS coordinates and different types of transport stations. Finally, among these proximity distances, the smallest one can be used to form another feature representing which type of transport station is closest among different choices of transport modes.

On-device activity recognition output: Modern smartphones (and other mobile devices) and mobile operating systems offer an on-device activity recognition facility to aid contextual applications to collect user activities or react to a change in user's physical activity. They often provide coarse-grained information on what the current physical activity of the user is, for example, whether the user is walking, in a vehicle (without necessarily identifying the transportation mode), or still. These on-device activity predictions, although often coarse-grained and not highly accurate, can be used as supporting evidence for transportation mode classification, if available. The raw activity recognition output can be used as it is, or summarized to produce a distribution of distinct activity labels.

Map-match information: Telematics applications often involve a task of "map matching", a process for determining the trajectory of a vehicle on route networks given location and sensor measurements provided by a mobile device. If the map matching information is available, the classifier can collect two categories of information: 1. the types of the matched route segments, including the category of a route (e.g. road, train track, or ferry route) and the class of a route within the specific route category (e.g. highway vs local street for category road). For each segment, the most dominant category and class, and their relative fractions, are used as features. 2. how much the map matched output deviates from input location measurements (i.e., GPS or network location). A high deviation makes the classifier prefer certain transportation modes that do not have to travel on a route network (e.g., bike, foot, boat, off-road) than others (e.g., car on a road network).

Dispersion and density of location measurements: The spatial dispersion and temporal density of location measurements can be computed for a given segment. The spatial dispersion characterizes how coordinates reported by location samples change over time. For each GPS or network location, the bounding box of location samples can be computed, and the length of the diagonal of the bounding box is taken as a measure of spatial dispersion of that type. For network location samples, we repeat the process by measuring the dispersion from all samples first, then only from high-accuracy samples. The difference between the two metrics captures how noisy low-accuracy location samples are compared to high-accuracy samples, and is effective in characterizing phantom recordings triggered by noisy location alerts. The temporal density is computed as the number of measured location samples in a unit time (i.e., the number of samples in a segment divided by the duration). A low density of samples implies that the user was possibly indoors (e.g., phantom) or underground (e.g., subway train). A low density of high-accuracy network location samples implies that the user was possibly in a rural area where high-positional-accuracy network locations, such as Wi-Fi (802.11), were not available, implying certain transportation modes were more likely.

Straightness of trajectory: In some implementations, different levels of straightness can be used to define how straight a path is. One level involves macroscopic straightness, which is captured by counting how frequently the heading of the mobile device changes in excess of a predefined threshold within the location trajectory. Macroscopic straightness is used to differentiate transportation modes that do not or cannot change heading frequently (e.g., train, airplane) from modes that can change heading more frequently and can use a shorter turning radius (e.g., car).

Another level is microscopic straightness, captured by measuring how noisy a path is in the direction orthogonal to the direction of instantaneous movement (i.e., how "wiggly" a path is). In some cases, one can apply the Ramer-Douglas-Peucker algorithm to simplify a path, and compare the cumulative distance of the simplified path to that of the original path. A higher difference indicates that the path contains a larger lateral noise component, implying that the path could have been taken by a slow-moving and less straight transportation mode (e.g. foot).

Public transit information: Public transit agencies publish transportation schedules and routes to help transit application developers, often in a common data format such as General Transit Feed Specification. The data can contain routes, stop locations, and timetables, among others, which can be used to identify if a close match exists with the data of the segment, and what the closest matches are. If one or more close matches are found, then the associated transportation modes can be directly used as features for the classifier. To perform matching, the technology encodes the trajectory of the trip to be classified by extracting stop locations (from speed and accelerometer and gyroscope measurements) and corresponding timestamps, and represent them as a series of timestamped stop events. The series is matched against routes in public transit data (with stop times and locations embedded in it). Dynamic time warping can be used to tolerate minor differences and omissions of stop times and locations. The top matches within the predefined match threshold are selected as features.

Historical user labels and predictions: The classifier may have several channels to learn about a particular user's travel patterns and preferred transportation modes. For example, a user-facing mobile application on the mobile device may allow the user to set preferred transportation modes within the app, or to enter or correct a transportation mode for the current trip or older trips. If such data is available, the technology can create a distribution of manual labels as well as a summary of trip patterns in terms of time and location for each type of user label. This historical summary information is then used for personalized matching of the current trip, resulting in matching scores, one for each possible user label, which are used for classification.

Transportation Mode Classification Algorithm

Given the features acquired or computed as described above, the transportation mode segment classifier predicts the most likely transportation mode of the given segment and a confidence measure ranging from 0 to 1. The classifier uses gradient boosting with decision trees as base learners ("gradient boosted trees"). A classification model is built by fitting a large number of decision trees on training data, gradually one by one, until a chosen loss function ("training error") is minimized, or the number of trees being fitted reaches a predefined number of rounds.

The process of training the classifier is as follows. A curated set of labeled recordings (trips) is prepared to be used as training data. The trip labels in the training data mostly come from user labels provided by end users of mobile telematics applications. Other sources of trip labels could include parties other than the end users, results of previous classifications by algorithms, or prior data having known labels. The technology preprocesses the training data including sensor data, on-device activity predictions, map match results, and user history data. The preprocess step includes data cleansing, outlier removal, timestamp correction, and other steps to bring input training data into a form ready for processing. The preprocessed training data for each trip is segmented as described earlier. Each resulting segment becomes an individual data point in the training set for the segment classifier. Features are extracted for each segment as described earlier. The features computed from all of the data points (segments) constitute a feature matrix, which the classifier training algorithm takes as input. The training algorithm trains the classifier using the feature matrix and evaluates the classifier using cross validation, by checking the expected performance and varying training parameters as necessary. Once a good classification model is found, a final classifier is trained using the best model found using all training data available. The final model is saved in persistent storage so that it can be loaded later and used for prediction of transportation modes for recordings of new trips.

During the training process, if implemented naively, the model may over-fit to the given training data, resulting in a classifier that does not work as expected in practice for recordings of new trips. Several strategies can be used to combat over-fitting. The strategies include one or a combination of two or more of: limiting the depth of the individual decision trees, limiting the maximum number of trees in the ensemble, controlling the learning rate of subsequent base learners, imposing a minimum number of samples required for the decision tree to split further, and random subsampling of training examples and features during decision tree fitting process.

At the end of the training, the final classification model is stored in a permanent storage and deployed to production servers. When a recording for a trip is presented from a mobile device for trip mode classification, a production server loads and applies the stored final classification model to the trip, producing segment-by-segment trip mode identifications. In some implementations, the final classification model can be transferred to the mobile device, which loads and applies it to identify a transportation mode for the trip. In some implementations, the computational work of applying the model to the data of the recordings can be split between the server and the mobile device.

In some cases, there are recordings of trips for which a transportation mode can be predicted or rejected unequivocally due to certain features of the recording data. In this case, identification overrides can be applied to correct the final identified transportation mode. For example, if both an extreme speed and an extreme altitude are detected, the only sensible choice among the transportation modes is airplane. Another example is a phantom recording when the accelerometer measurements do not represent any noticeable motion. Certain transportation mode identifications can be safely rejected when a certain requirement for the identified transportation mode is not meet. For example, if a nontrivial number of speed observations occur over about 10 meters/second, the transportation mode during that period cannot be foot. Such a mode identification would be erroneous and would be rejected. When an identification is rejected, the next best identification by the classifier is taken and the associated confidence is renormalized.

The classifier should be able to learn optimal associations between features and transportation modes; in practice, the classifier may not learn some associations or learn erroneous associations instead, due to, for example, lack of data, lack of features, or noisy input labels. The overrides of transportation mode identifications are designed to correct misclassification against this imperfect learning by the classifier.

Temporal Smoothing

The segment classifier described above identifies a transportation mode for each segment in a recording of a trip and generates a corresponding probability measure. An individual identification may not be accurate, for example, due to lack of information within the segment data or due to imperfect segment transportation mode classification or a combination of them. Such identifications, taken one by one for the segments, do not benefit from temporal regularities and dynamics that span successive segments. For example, people may not switch back and forth frequently between different transportation modes, and certain mode transitions may occur more frequently in general than the others. For example, it is not likely to switch from airplane to car without foot in between; and the probability of a transition from airplane to bike is much less than to car.

A temporal smoothing algorithm can be used to improve mode identification results using the intuitions above. Temporal smoothing can be modeled as a hidden Markov model (HMM), which, given a sequence of segment transportation mode identifications as input, produces a "smoothed" sequence of segment transportation mode identifications as output.

In this HMM, the state space comprises the possible transportation modes. The observation space is based on the segment transportation mode identification label and its associated confidence (probability). The probability value is converted to a discrete value by quantization and augmented using the transportation mode prediction label to produce a new observation symbol used as an input for HMM. For example, a segment classification result of "boat" with probability 0.95 will be translated to "boat-1", assuming that the probability 0.95 falls into bucket number 1. Given this HMM representation, a learned HMM can predict a smoothed sequence of predictions from an input classification sequence using an HMM prediction algorithm, such as the Viterbi algorithm. Also, an HMM can be trained from labeled or unlabeled data using expectation-maximization algorithms, such as the Baum-Welch algorithm.

Role Identification

In some implementations, for smoothed segments identified as being of transportation mode "car", the role classifier identifies the role of participant, for example, as driver or passenger. The role classifier uses the same set of data sources as the transportation mode classifier, as described earlier, but computes a different set of features engineered to identifier user roles in a car.

Role Labels

When predicting roles for a given user for a given recording of a trip, the role classifier utilizes historical user labels available at the time of the prediction from the user, to learn user-specific role behavior (that is, user role specific feature components), as well as labels from other users and recordings within the same spatial-temporal group of users (e.g., users and trips in the same country or during the same season or both), to learn general role behavior (that is, general population role feature components). Many features outlined below combine these two different sources of information, general and user-specific, in an appropriate way. For example, if only a limited amount of user-specific information is available because the user gave only a small number of role labels previously, the role classifier will put a heavier weight on the general population components when computing some of the features below.

It can be assumed that a user can either label a trip based on her role, or not give any role label to it. Therefore, when computing features based on historical user labels, previous trips by the user (or by a general population for computing a general population component) are grouped into three trip groups (in implementations in which the roles are limited to passenger and driver): driver-labeled trips, passenger-labeled trips and unlabeled trips. Features below capture association of the trip to be predicted to each of the three groups in terms of certain trip characteristics. Unlabeled trips are not necessarily assumed to be either primarily driver trips or primarily passenger trips; the role classifier training process is permitted to learn any association from data, if it exists.

Role Prediction Features

Here we describe features that are used by the role classifier in implementations in which there are only two roles, driver and passenger for car trips.

Passenger prior: The passenger prior feature captures how frequently the user travels as a passenger compared to being a driver, providing a user-specific bias ("prior") for the passenger classification. The feature is computed as the fraction of trips labeled as driver from the historical user role labels. During an initial period, a user may not have traveled and labeled a sufficient number of car trips required for a reliable estimate of the passenger prior feature. To deal with this lack of data, the role classifier combines the user-specific estimate with a general-population passenger prior feature using suitable weights based on the number of trips or the number of days elapsed. The weights are chosen in a way that a user-specific passenger prior feature begins to surpass the general-population's passenger prior once the user completes a certain number of trips or after a certain number of days.

Locality: The locality features represent proximity to regions where the user typically travels as a driver or as a passenger. For example, car trips near one's home location could be more likely to be driver trips, whereas trips in another country might have a higher probability of being passenger trips. Instead of matching current trips with predefined locations, the locality features encode this knowledge by finding a set of representative locations for each of the three trip groups (driver, passenger and unlabeled) and matching the current trip to each group in terms of location proximity. Hence, this feature does not assume any contextual association between the type of location and the probability of being a driver or a passenger.

Contextual proximity: Users may have a preferred role depending on the type of the origin and destination of a trip. In other words, certain types of origin and destination locations may have an association to the role of the user. A few types of key locations are determined for each user, such as home, work and airport. Such key locations may be provided by the user (by setting their work and home locations), be given from an external database (for example, airport locations), or be extracted automatically from a user's travel patterns. For each type of identified key location, the frequencies of role as driver and passenger are tracked. For the classification of a current trip, the role classifier first determines if the current trip matches any of the user's identified key locations. If there is a match, the relative frequency of driver role over passenger role enables user-specific location-based contextual bias.

Trip similarity: This feature examines if the current trip has spatial or spatio-temporal similarity to trips in one of the trip groups. For each trip group, every trip within the group is compared to the current trip by origin and destination, travel path and time of day, in which the current trip and the trip in the group are considered similar if the matches are successful within predefined thresholds. A similarity of each trip group is computed as a fraction of similar trips in the group and is provided to the role classifier as a feature representing trip similarity to the group.

Calendrical variations: A user's pattern of roles, for example, as driver and passenger, may exhibit daily, weekly or seasonal variations. The role classifier captures these calendrical variations by counting the number of trips by role label (driver or passenger) and temporal groupings such as hour of day, day of week, month and season. Like the passenger prior feature, these statistics are combined with the same statistics drawn from a general population to account for a possible lack of user-specific data and to prevent over-fitting.

Driving behavior signature: Driving behavior captured and scored in terms of car motions (sudden acceleration, braking and turning), speeding and phone usage varies by user and can be used as a signature representing each driver. If such driving behavior profiles or scores are available, those for trips that were known to be the user's trips in the driver role are stored and compared later to determine a similarity of the driving behavior for the current trip to the driving behavior signature.

Phone usage patterns: Normally, drivers are not expected to use their phones while driving. When they do, they usually, although not always, use their phones at a low speed or when the car is stopped sitting in traffic or waiting on a signal. As such, phone usage and stop locations of the car are co-located more often for trips in which the user has a driver role than for trips for which the user has a passenger role. Phone usage can be detected by combining on-phone events such as screen-unlock events or foreground app information with phone movements or both, and detect car stops by examining GPS speed observations or accelerometer or gyroscope sensor signals or combinations of them. If these two different types of events appear together or adjacent in time, we determine that phone usage and car stopping are co-located at the particular moment. From these joined co-location events, various statistics such as total length, frequency and typical length of co-locations are extracted as features for the role classifier.

Vehicle turning radius: For a passenger vehicle, a driver and passengers may sit on opposite sides of the vehicle. For instance, in a right-side traffic system, a driver sits exclusively on the left side of the car in most types of vehicles, while passengers may sit on the right side of the vehicle. That is, the driver's position is located to the left from the centerline of the car by tens of centimeters or more, and the passenger's position may be located to the right from the centerline. When a car is turning, this separation from the centerline of the car creates a difference in the centrifugal accelerations of the driver position and the passenger position. Instantaneous centrifugal acceleration captured by an accelerometer of the mobile device can be compared against the centrifugal acceleration experienced at the centerline of the vehicle, computed from GPS speed and the yaw rate measured by the mobile device.

Role Classification Algorithm

The role classifier uses gradient boosted trees as a base classification algorithm similarly to the transportation mode classification. The process used for the role classification is similar to the process used for transportation mode classification as described above, including the process of preparing a training data set, preprocessing the training data, extracting features, training a model, and evaluating with cross validation. Similar strategies also are used to prevent the final model from over-fitting to data. Similarly as for the transportation mode classifier, the final role classification model is stored, deployed and used for prediction on the server (in some implementations), or in the phone (in some implementations).

Trip Labeling

Often, it is useful to assign a single label (including a transportation mode and role) at a trip level, not at a segment level, when a trip spans more than one segment. To create a single, representative trip label, the following schemes or others may be used, depending on application requirements.

In some implementations, if the start and end boundaries of a recording do not have to be preserved, i.e. if trip boundaries can be altered or new trips created, multiple trips can be defined by segmenting the recording at the times when segment labels change. This scheme, a may impose a requirement for a sequence of segments having the same label to qualify as a single trip, such as a minimum duration or a minimum average probability.

In some implementations, start and end boundaries of a recording may be rigid and have to be preserved. This situation may occur if the boundaries are determined by the source (e.g., a mobile application) and cannot be modified. If so, the most representative label for the data within the predefined boundaries may be used. Among the methods that may be used, depending on the application, are majority voting and longest-stretch label. The majority voting scheme uses the transportation mode label for which the sum of durations of segments classified as being of that mode is the largest. The longest-stretch label method selects the label associated with a longest stretch of segments that would have an identical label. In both methods, segments that are transient (i.e., have a very short duration) or spurious (i.e. have a low probability) are ignored.

The final transportation mode and role labels can be provided to the end user in the application, who can in turn correct them as necessary. The corrections can be used to refine the classification algorithm in the next iterations. Also user-specific historical information, which is used for various user-dependent features, will immediately reflect any label changes done by the user. The prediction labels can also be provided to business customers for subsequent uses and analyses.

As mentioned earlier, part or all of the transportation mode and role classification steps may be done on the phone instead of or in conjunction with the server.

Other implementations are also within the scope of the following claims.

The invention claimed is:

1. A method for improving operation of a computational device in identifying transportation modes of one or more segments of a particular trip and a role of a person as a passenger or a driver for each of the segments of the particular trip in which the transportation mode comprises transportation in a car, the method comprising:
    deriving features about prior trips from historical information for the prior trips, the historical information comprising motion information captured by sensors in vehicles during the prior trips and usage information received from mobile devices for the prior trips, the features being indicative of the transportation modes and the role of the person as a driver or a passenger for the prior trips;
    training one or more of a mode classifier and a role classifier based at least in part on the features about the prior trips;
    accessing, from persistent storage and by the computational device, the mode classifier and the role classifier;
    receiving, by the computational device, information about the particular trip by the person, the information comprising motion information captured by one or more sensors during the particular trip and usage information received from a mobile device of the person on the particular trip;
    deriving, by the computational device, features about the particular trip from the information about the particular trip, the features comprising at least one feature related to motion during the particular trip and at least one feature related to usage of the mobile device during the particular trip;
    processing, by the computational device, the features about the particular trip with the mode classifier accessed from persistent storage to determine one or more segments of the particular trip in which a transportation mode comprises transportation in a car; and
    for each of the one or more segments of the particular trip in which the transportation mode comprises transportation in a car, processing, by the computational device, the features about the particular trip with the role classifier accessed from persistent storage to determine the role of the person as a driver or passenger of the car during the respective segment of the particular trip.

2. The method of claim 1 in which the motion information captured during the prior trips or during the particular trip comprises velocity or acceleration information.

3. The method of claim 2 in which the features about the prior trips comprise one or more of acceleration greater than a threshold, deceleration greater than a threshold, or velocity greater than a threshold.

4. The method of claim 1 in which the historical information comprises non-motion information received from a mobile device during a trip.

5. The method of claim 1 in which the historical information comprises role information for the prior trips, wherein at least a portion of the role information is determined without input from the person.

6. The method of claim 1 in which the features about the prior trips comprise a role frequency for the person for the prior trips.

7. The method of claim 1 in which the historical information comprises location information for the prior trips.

8. The method of claim 7 in which the features about the prior trips comprise one or more representative locations for the person for the prior trips, each of the representative locations being associated with a role of the person.

9. The method of claim 1 comprising:
identifying one or more statistically significant changes in the information about the particular trip; and
segmenting the particular trip into the one or more segments based on the one or more changes.

10. The method of claim 9 comprising:
determining that a duration of at least one of the one or more segments exceeds a time threshold; and
segmenting the at least one of the one or more segments into segments having a duration less than or equal to the time threshold.

11. The method of claim 1 comprising:
determining a transportation mode for each of the one or more segments of the particular trip based on the features about the prior trips and the information about the particular trip; and
processing the transportation mode for each of the one or more segments with a Markov model to determine a temporally-smoothed transportation mode for each of the one or more segments of the particular trip.

12. The method of claim 1 comprising:
determining a role label for the particular trip based on the role of the person as passenger or driver for the one or more segments of the particular trip in which the transportation mode comprises transportation in a car.

13. The method of claim 12 in which determining the role label for the particular trip comprises:
aggregating the one or more segments based on the role of the person to determine a first duration for which the role of the person is passenger and a second duration for which the role of the person is driver; and
determining the role label based on the greater of the first duration or the second duration.

14. The method of claim 12 in which the role label is determined based on a role associated with a longest continuous stretch of the one or more segments for which the role of the person is identical.

15. The method of claim 12 comprising providing the role label to a computing device associated with the person.

16. The method of claim 15 comprising:
receiving feedback about the role label from the computing device, the feedback including a change to the role label; and
updating processes of the role classifier based on the feedback.

17. The method of claim 1, wherein the features about the particular trip comprise a first set of features, the method including:
for each of the one or more segments of the particular trip in which the transportation mode comprises transportation in a car:
deriving, by the computational device, a second set of features from the information about the particular trip associated with the respective segment of the particular trip, the second set of features comprising at least one feature that is different from each feature in the first set of features; and
processing, by the computational device, the second set of features with the role classifier accessed from persistent storage to determine the role of the person as a driver or passenger of the car during the respective segment of the particular trip.

* * * * *